United States Patent
Rarick

(10) Patent No.: US 10,146,503 B2
(45) Date of Patent: *Dec. 4, 2018

(54) ROUNDING FLOATING POINT NUMBERS

(71) Applicant: Imagination Technologies Limited, Kings Langley (GB)

(72) Inventor: Leonard Rarick, San Diego, CA (US)

(73) Assignee: Imagination Technologies Limited, Kings Langley (GB)

(*) Notice: Subject to any disclaimer, the term of this patent is extended or adjusted under 35 U.S.C. 154(b) by 72 days.

This patent is subject to a terminal disclaimer.

(21) Appl. No.: 15/292,368

(22) Filed: Oct. 13, 2016

(65) Prior Publication Data

US 2017/0031655 A1    Feb. 2, 2017

Related U.S. Application Data

(63) Continuation of application No. 14/498,183, filed on Sep. 26, 2014, now Pat. No. 9,489,174.

(51) Int. Cl.
*G06F 7/499* (2006.01)
*G06F 7/483* (2006.01)
*G06F 7/544* (2006.01)

(52) U.S. Cl.
CPC .......... *G06F 7/483* (2013.01); *G06F 7/49957* (2013.01); *G06F 7/5443* (2013.01)

(58) Field of Classification Search
None
See application file for complete search history.

(56) References Cited

U.S. PATENT DOCUMENTS

| | | |
|---|---|---|
| 5,128,889 A | 7/1992 | Nakano |
| 5,150,319 A | 9/1992 | Zyner |
| 9,489,174 B2* | 11/2016 | Rarick ............ G06F 7/483 |
| 2002/0198919 A1 | 12/2002 | Kelkar |
| 2008/0183791 A1 | 7/2008 | Ho et al. |
| 2013/0212139 A1 | 8/2013 | Gschwind et al. |
| 2016/0092167 A1* | 3/2016 | Rarick ............ G06F 7/483 |
| | | 708/497 |
| 2017/0031655 A1* | 2/2017 | Rarick ............ G06F 7/483 |

OTHER PUBLICATIONS

Even, Guy et al.; "A comparison of three rounding algorithms for IEEE floating-point multiplication"; IEEE Transactions computers; vol. 49, Issue 7; Jul. 2000; 8 pages.

Lutz, David R.; "Fused Multiply-Add Microarchitecture Comprising Separate Early-Normalizing Multiply and Add Pipelines"; In the Proceedings of the 20th IEEE Symposium on Computer Arithmetic, 2011; Jul. 25-27, 2011; pp. 123-128.

Schwarz, Eric M. et al.; "Hardware Implementations of Denormalized Numbers"; In the Proceedings of the 16th IEEE Symposium on Computer Arithmetic, 2003; Jun. 15-18, 2003; 9 pages.

* cited by examiner

*Primary Examiner* — David H Malzahn
(74) *Attorney, Agent, or Firm* — Vorys, Sater, Seymour and Pease LLP; Vincent M DeLuca

(57) ABSTRACT

Embodiments disclosed pertain to apparatuses, systems, and methods for floating point operations. Disclosed embodiments pertain to a circuit that is capable of processing both a normal and denormal inputs and outputting normal and denormal results, and where a rounding module is used advantageously to reduce operational latency of the circuit.

20 Claims, 6 Drawing Sheets

| | Increment Needed? | S[127] | S[74] | R[52] | RoundedSum [52:0] 400 |
|---|---|---|---|---|---|
| 1 | NO | 1 or denormal | X | X | S[127:75] |
| 2 | NO | 0 and normal | X | X | S[126:74] |
| 3 | YES | 1 or denormal | X | X | R[52:0] |
| 4 | YES | 0 and normal | 0 | X | {S[126:75], 1} |
| 5 | YES | 0 and normal | 1 | 0 | {R[51:0], 0} |
| 6 | YES | 0 and normal | 1 | 1 | R[52:0] |

FIG. 4A

| | Increment Needed? | S[127] | S[74] | R[52] | RoundedSum [52:0] 450 |
|---|---|---|---|---|---|
| 1 | NO | 1 or denormal | X | X | S[127:75] |
| 2 | NO | 0 and normal | X | X | S[126:74] |
| 3 | YES | 1 or denormal | X | X | R[52:0] |
| 4 | YES | 0 and normal | 0 | X | {S[126:75], 1} |
| 5 | YES | 0 and normal | 1 | X | {R[52] OR R[51], R[50:0], 0} |

FIG. 4B

| | Increment Needed? | S[127] | S[74] | R[52] | RoundedSum [52:0] 475 |
|---|---|---|---|---|---|
| 1 | NO | 1 or denormal | X | X | S[127:75] |
| 2 | NO | 0 and normal | X | X | S[126:74] |
| 3 | YES | 1 or denormal | X | X | R[52:0] |
| 4 | YES | 0 and normal | 0 | X | {S[126:75], 1} |
| 5 | YES | 0 and normal | 1 | X | {1, R[50:0], 0} |

FIG. 4C

| | Increment Needed? | S[127] | S[103] | R[23] | RoundedSum [23:0] 480 |
|---|---|---|---|---|---|
| 1 | NO | 1 or denormal | X | X | S[127:104] |
| 2 | NO | 0 and normal | X | X | S[126:103] |
| 3 | YES | 1 or denormal | X | X | R[23:0] |
| 4 | YES | 0 and normal | 0 | X | {S[126:104], 1} |
| 5 | YES | 0 and normal | 1 | 0 | {R[22:0], 0} |
| 6 | YES | 0 and normal | 1 | 1 | R[23:0] |

FIG. 4D

| | Increment Needed? | S[127] | S[103] | R[23] | RoundedSum [23:0] 485 |
|---|---|---|---|---|---|
| 1 | NO | 1 or denormal | X | X | S[127:104] |
| 2 | NO | 0 and normal | X | X | S[126:103] |
| 3 | YES | 1 or denormal | X | X | R[23:0] |
| 4 | YES | 0 and normal | 0 | X | {S[126:104], 1} |
| 5 | YES | 0 and normal | 1 | X | {R[23] OR R[22], R[21:0], 0} |

FIG. 4E

| | Increment Needed? | S[127] | S[103] | R[23] | RoundedSum [23:0] 490 |
|---|---|---|---|---|---|
| 1 | NO | 1 or denormal | X | X | S[127:104] |
| 2 | NO | 0 and normal | X | X | S[126:103] |
| 3 | YES | 1 or denormal | X | X | R[23:0] |
| 4 | YES | 0 and normal | 0 | X | {S[126:104], 1} |
| 5 | YES | 0 and normal | 1 | X | {1, R[21:0], 0} |

FIG. 4F

ROUNDING FLOATING POINT NUMBERS

FIELD

The subject matter disclosed herein relates to processors, in general, and more specifically to the rounding of floating point numbers.

BACKGROUND

Floating point operations have applications in many areas including real-time 3D graphics, linear algebra, partial differential equations, and Fourier transformations. Therefore, modern floating point unit (FPU) designs are increasingly designed to perform fast operations in both single and double precision. Accordingly, in many floating point execution unit designs, the FPU pipeline is optimized for the common case of normalized numbers. Exceptions, such as denormals arising during computation, are often handled in software. However, denormals are important to facilitate gradual underflow. Therefore, for better performance, efficient hardware execution units that handle input and/or output denormal values efficiently are desirable. As used herein, the term "floating point operations" or "floating point arithmetic operations" refer generally to arithmetic operations involving floating point numbers including addition/subtraction, multiplication, division, multiply-add, square root, reciprocals, reciprocal square roots, transcendental function computation, etc.

Further, in FPUs that perform multi-precision floating point operations, the rounding of results is often performed. Therefore, circuits that perform efficient multi-precision rounding are increasingly useful.

The IEEE Standard describes four rounding modes which are (i) round to Zero (RTZ), where all numbers are rounded toward zero, (ii) round to infinity (RI), where negative numbers are rounded toward zero and positive numbers are rounded away from zero, (iii) round to negative infinity (RNI), where negative numbers are rounded away from zero and positive number are rounded toward zero, and (iv) round to nearest. Typically, an FPU "rounding mode" may determine which of the IEEE conventions is used.

In many modern FPUs, injection rounding techniques are used to reduce the number of rounding modes, for example, to RTZ. The term "injection rounding" refers to the injection of a value before the carry look ahead addition, where the injected value (to correctly effect the rounding) is determined based on the actual rounding mode being applied. Many processor designers favor injection rounding for speed and efficiency reasons because: (i) execution latency is usually not increased by insertion of the injection values; and (ii) adjustments after carry look ahead addition to obtain rounded values may proceed quicker than conventional non-injection rounding. However, issues arise when injection rounding is used with denormal inputs or results because it is not known where the injection value is to be inserted until after a normalizing shift of the denormal number has been completed.

Further, conventional FPUs that use non-injection rounding often wait for the value of the most significant bit (msb) of the mantissa (e.g. the $52^{nd}$ bit position for double precision floating point) to be known prior to starting the rounding process to determine the correctly rounded result based on rounding mode. However, latency arises in conventional circuits using non-injection rounding because the value of the msb, for example, in a multiply operation is generally known late in the computation. Thus, conventional non-injection rounding techniques often experience considerable latency.

Therefore, some disclosed embodiments present an efficient low latency structure for floating point execution units with non-injection rounding, while providing for denormal inputs and outputs.

SUMMARY

Disclosed embodiments pertain to a floating point arithmetic unit comprising a rounding module configured to receive an unrounded result. In some embodiments, the rounding module may further comprise: a multiplexer configured to select one of: a first bitstring selected from a first plurality of bitstrings, wherein each bitstring in the first plurality of bitstrings comprises a corresponding bit sequence of the unrounded result, or a second bitstring selected from a second plurality of bitstrings, wherein each bitstring in the second plurality of bitstrings comprises a corresponding bit sequence of an incremented result obtained by incrementing the unrounded result, and wherein the selection of the first or second bitstring is based on bits in the unrounded result.

In another aspect, a processor may comprise a floating point unit (FPU) configured to produce a rounded result, wherein the FPU may further comprise: a rounding module configured to receive an intermediate unrounded result of an operation performed by the FPU. In some embodiments, the rounding module may further comprise: a multiplexer configured to select one of: a first bitstring selected from a first plurality of bitstrings, wherein each bitstring in the first plurality of bitstrings comprises a corresponding bit sequence of the unrounded result, or a second bitstring selected from a second plurality of bitstrings, wherein each bitstring in the second plurality of bitstrings comprises a corresponding bit sequence of an incremented result obtained by incrementing the unrounded result, and wherein the selection of the first or second bitstring is based on bits in the unrounded result.

In another aspect, a non-transitory computer-readable medium may comprise executable instructions to describe a floating point unit (FPU) capable of being configured to produce a rounded result, wherein the FPU may comprise: a rounding module configured to receive an intermediate unrounded result of an operation performed by the FPU. The rounding module may further comprise: a multiplexer configured to select one of: a first bitstring selected from a first plurality of bitstrings, wherein each bitstring in the first plurality of bitstrings comprises a corresponding bit sequence of the unrounded result, or a second bitstring selected from a second plurality of bitstrings, wherein each bitstring in the second plurality of bitstrings comprises a corresponding bit sequence of an incremented result obtained by incrementing the unrounded result, and wherein the selection of the first or second bitstring is based on bits in the unrounded result.

The disclosure also pertains to circuits, processors, apparatuses, systems, and computer-readable media embodying instructions that describe the above embodiments.

BRIEF DESCRIPTION OF THE DRAWINGS

FIGS. 4A-4F show tables illustrating the logic associated with rounding module 248 shown in the exemplary circuit in FIG. 3.

DETAILED DESCRIPTION

The detailed description set forth below in connection with the appended drawings is intended as a description of some exemplary non-limiting embodiments and various other embodiments may be practiced and are envisaged as would be apparent to one of skill in the art. Embodiments described are provided merely as examples or illustrations of the present disclosure. The detailed description includes specific details for the purpose of providing a thorough understanding of the present disclosure. However, it will be apparent to those skilled in the art that the present disclosure may be practiced without one or more of these specific details. In some instances, well-known structures and devices are not shown in block diagram form in order to avoid obscuring the concepts of the present disclosure. Acronyms and other descriptive terminology may be used merely for convenience and clarity and are not intended to limit the scope of the disclosure. In general, disclosed embodiments may be implemented using some combination of hardware, firmware, and software.

Figure 1:
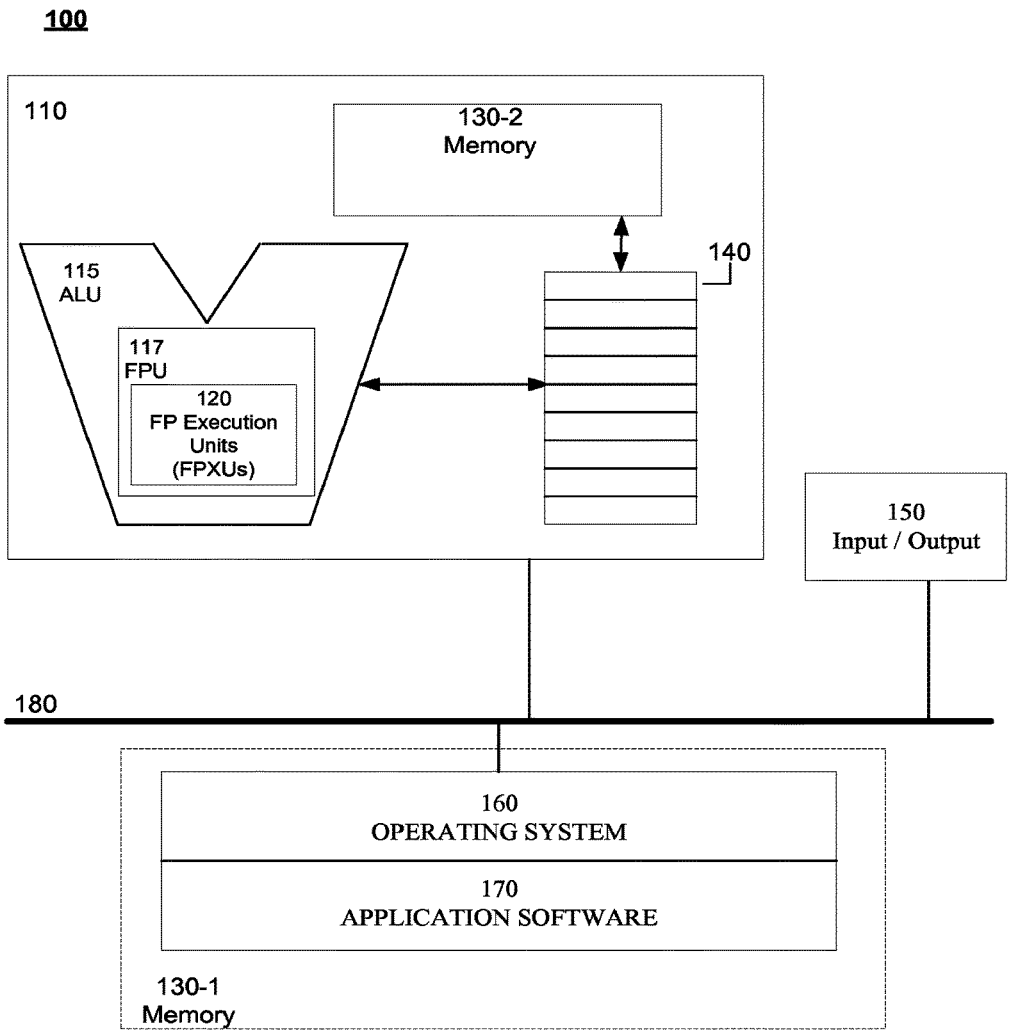
FIG. 1 shows a schematic block diagram illustrating certain exemplary features of a computer system including a processor capable of performing floating point operations.

FIG. 1 shows a simplified schematic block diagram illustrating certain exemplary features of a computer system 100 including a processor 110 capable of performing floating point operations, including addition/subtraction, multiplication, division, fused multiplication-addition, square root, reciprocals, reciprocal square roots, transcendental functions, etc. As shown in FIG. 1, computer system 100 may further include Input-Output (I/O) devices 150 such as a keyboard, mouse, touchscreens, pens, displays, speakers, sensors, multi-media devices, printers etc. Processor 110, I/O devices 150 and other system components may be coupled using bus 180. Memory 130-1 may also be coupled to the bus 180. Memory 180 may store operating system 160 and application software 170.

In some embodiments, processor 110 may include Arithmetic Logic Unit 115 and register file 140, and memory 130-2. In general, processor 110 may comprise several additional functional units, such as additional ALUs 115, which may include integer units, floating point units (FPUs) 117, external bus interface units, clock, pipelined execution units, scheduling units, clocks, and/or other support logic. Many of these functional units have been omitted in FIG. 1 merely to simplify discussion. Processor 110 may be incorporated in a variety of electrical, electronic or electro-mechanical devices along with one or more additional components.

Processor 110 may be implemented using a combination of hardware, firmware, and software. In general, processor 110 may represent one or more circuits configurable to perform computations, including floating point operations in a manner consistent with disclosed embodiments. Processor 110 may be implemented within one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, embedded processor cores, integrated circuits, electronic devices, other electronic units designed to perform the functions described herein, or a combination thereof. In some embodiments, portions of techniques disclosed herein may also be implemented using firmware and/or software.

As used herein, the term "memory" is used to refer to any type of long term, short term, volatile, nonvolatile, or other memory and is not to be limited to any particular type of memory or number of memories, or type of physical media upon which memory is stored. In some embodiments, memories 130-1 and 130-2 (collectively referred to as memory 130) may hold instructions and/or data to facilitate operations performed by processor 100. For example, instructions/data may be loaded into register file 120 from memory 130 for use by ALU 115. For example, the instructions received may pertain to a floating point operations, including addition, subtraction, multiplication, division, fused multiply-add, square root, reciprocal and other operations executed by ALU 115 and the results of the operation may be stored in register file 140 and in memory 130-2. In general, memory 130-2 may represent any data storage mechanism.

In some embodiments, memory 130 may include a hierarchy of memories, such as, for example, a primary memory and/or a secondary memory. Primary memory may include, for example, a random access memory, read only memory, etc.

Secondary memory may include, for example, the same or similar type of memory as primary memory and/or one or more data storage devices or systems, such as, for example, flash/USB memory drives, memory card drives, disk drives, optical disc drives, tape drives, solid state memory drives, etc.

Memory 130 may include a hierarchy of cache memories. For example, memory 130 may include an instruction and/or data cache. In some embodiments, memory 130 may also include a Read Only Memory (ROM) or other non-volatile memory, which may be used to store microcode to facilitate performance of one or more operations by processor 110.

In some embodiments, ALU 115 may include FPU 117, which may be used to perform floating point operations. FPU 117 may comprise one or more floating point execution units (FPXUs) 120, which may be used to various perform floating point (FP) operations such as add, subtract, multiply, divide, multiply-add, square root, reciprocal, reciprocal square root, transcendental function computation, etc. and round the results obtained. In some embodiments, FU 117 may be capable of processing denormal numbers in hardware. In some embodiments, the rounding may be performed by a rounding module, which may be capable of performing rounding operations for floating point numbers including denormal numbers in hardware. In some embodiments, the rounding module may be shared between execution units. In some embodiments, one or more execution units may have dedicated rounding modules. In general, rounding modules may be dedicated and/or shared between execution units. For example, FPXU 120 may include an FP multiply execution unit with a rounding module, which may be used to perform floating point (FP) multiply operations, including rounding, in a manner consistent with disclosed embodiments.

In certain implementations, secondary memory may be operatively receptive of, or otherwise configurable to couple to a computer-readable medium in a removable media drive (not shown in FIG. 1) coupled to processor 110. In some embodiments, the computer-readable medium may comprise instructions that describe a processor and/or a FPU, including a FP multiplier consistent with disclosed embodiments. For example, the descriptions may be provided in a hardware description language such as VHDL, Verilog, or any other hardware description language.

A floating point format allows a wide range of values to be represented with relatively few bits. A floating point number may be represented using binary bits including a sign bit, a set of bits representing an exponent, and another set of bits representing a mantissa (or "significand"). The value of a binary floating point number is broadly given by mantissa*$2^{exponent}$ with the sign of the number given by the sign bit. The precision of a floating point number is determined by the number of bits used for the mantissa, whilst the range of the floating point number is determined by the number of bits used for the exponent.

The mantissa of a normal number (i.e. not a subnormal or denormal number which is described below) is normalized such that it has no leading zeroes. Therefore, the mantissa of a normal number always starts with a one. As such, the first mantissa bit does not need to be stored. That is, a normalized mantissa represents a binary number $m_p.m_{p-1}m_{p-2}m_{p-3} \ldots m_1m_0$, where $m_i$ represents a binary digit at position i, p is the precision, and $m_p$ is non-zero such that $m_p$ does not need to be stored). For example, a "single precision" floating point number comprises a sign bit, 8 exponent bits and 24 mantissa bits (23 of which are actually stored). As another example, a "double precision" floating point number comprises a sign bit, 11 exponent bits and 53 mantissa bits (52 of which are actually stored).

Floating point values are not uniformly spaced. Instead, the spacing between representable floating point numbers decreases as the magnitude of the numbers decreases. With normal floating point numbers, the mantissa starts with a one, and the exponent sets the scale. However, the exponent has a limited range (limited by the number of bits used to represent the exponent). Therefore, to facilitate gradual degradation of precision, subnormal or denormal numbers are used.

Subnormal or denormal numbers are used to represent numbers where a normalized mantissa would result in an exponent that is too small to be represented by the exponent bits. Subnormal numbers are represented using leading zeroes in the mantissa. In a subnormal number, the exponent is the minimum that it can be for normal numbers but with a different representation, and the first bit of the mantissa is a zero (i.e. the mantissa represents a binary number $0.m_{p-1}m_{p-2}m_{p-3} \ldots m_1m_0$). This allows numbers closer to zero than the smallest normal number to be represented. If subnormal numbers were not used then there would be an underflow gap of numbers which cannot be represented between the smallest normal number and zero. This underflow gap can be filled using subnormal numbers. By filling the underflow gap like this, significant digits are lost, but not to the extent of losing all the significant digits for numbers in the underflow gap. Therefore, subnormal numbers provide a gradual underflow which allows a calculation to lose precision gradually when the result is small.

Figure 2:
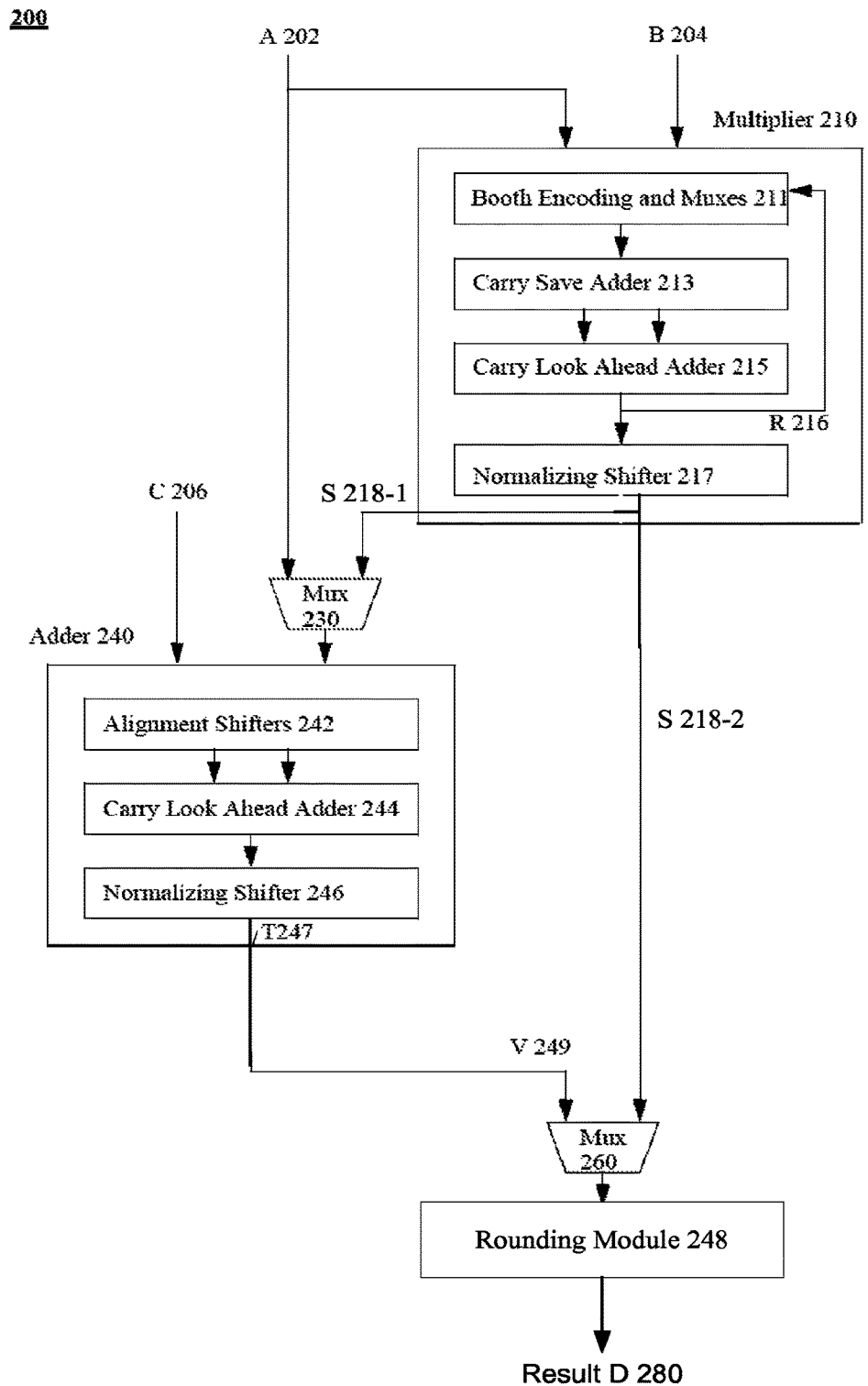
FIG. 2 shows a block diagram of an exemplary circuit consistent with disclosed embodiments for implementing various floating point arithmetic operations.

FIG. 2 shows an exemplary circuit 200 for implementing FP multiplication, FP addition, and/or FP multiply-add operations. In some embodiments, circuit 200 may be part of one or more execution units in FPXUs 120. Exemplary circuit 200 may be used to execute an operation on operands A 202 and B 204 to obtain result D 280 as D=A*B. Also exemplary circuit 200 may be used to execute an operation on operands A 202 and C 206 to obtain result D 280 as D=A+C. Further, exemplary circuit 200 may be used to execute an operation on operands A 202, B 204, and C 206 to obtain result D 280 as D=A*B+C. Fused multiply-add operations occur in many contexts such as dot products, matrix multiplication, Newton-Raphson evaluations of functions, etc.

The fused multiply add operation typically computes result D=A*B+C rounding once to the destination format. Thus, rounding typically is performed once to the result T 247 of adding the addend C 206 to the augend S 218, obtained by computing (A*B), to obtain result D 280.

In FIG. 2, floating point numbers A 202 and B 204 may be input to Booth encoder and multiplexers 211 in multiplier 210. Booth encoder and multiplexers 211 may generate partial products based on the control signals. The output of Booth encoder and multiplexers 211 is input to Carry Save Adders (CSA) 213. CSA 213 may include compressors, which may reduce the partial products to produce two partial product outputs, which are input to Carry Lookahead Adder (CLA) 215. CLA 215 may add the two terms and unshifted unrounded multiply result R 216 may be shifted by normalizing shifter 217 to obtain unrounded product S 218.

Unrounded product S 218 (e.g. A*B) may be input to multiplexer 230 where it may selected as input to adder 240. Operand C 206 is also input to adder 240, which may add the two operands to obtain the multiply add result 280 (e.g. (A*B)+C)). When performing floating point addition (e.g. A+C) multiplexer 230 may be configured to select input 202.

Adder 240 may comprise alignment shifters 242 which may align the input operands. The aligned operands are input to CLA 244, which may add the aligned operands to generate an unshifted unrounded sum. The unshifted unrounded sum is input to normalizing shifter 246, which may output shifted unrounded sum T 247.

Multiplexer 260 may select one of: (i) unrounded multiply-add result (A*B)+C V 249, (ii) unrounded product A*B shown as S 218-2, or (iii) unrounded sum result A+C shown as V 249. In some embodiments, the intermediate signals may be made available for use by other functional and logical units, such as unshifted unrounded multiply result R 216 which may be used for Newton-Raphson iterations.

In some embodiments, as shown in FIG. 2, a rounding module 248 consistent with disclosed embodiments to round the results may be shared between adder 240 and multiplier 210 and the rounding module 248 may be enabled at an appropriate point during the computation to output final shifted rounded result D 280. In some embodiments, multiplier 210 and adder 240 may each include a rounding module 248. In some embodiments, rounding unit 248 may be capable of handling denormal numbers. As one example, in some instances, the output of Adder 240 and/or Multiplier 210 may be a denormal result, which may be rounded using rounding unit 248. The operation and logic of rounding unit 248 is described in more detail in FIG. 3.

In general, rounding module 248 may form part of FPU 117, FPXUs 120, or a floating point arithmetic unit and may receive an unrounded result. In some embodiments, the unrounded result may be an intermediate result determined by one or more functional or logical units within FPU 117 or FPXUs 120.

Figure 3:
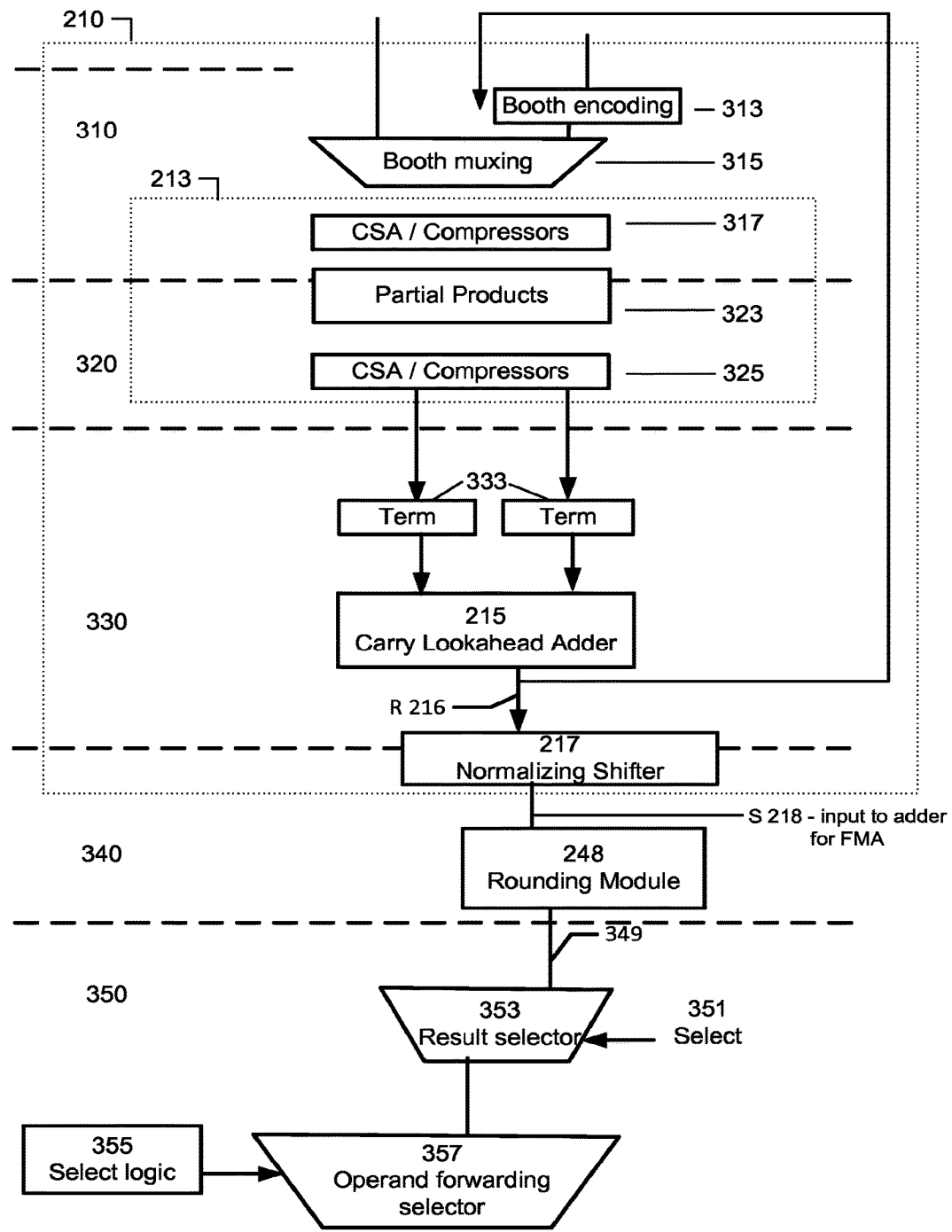
FIG. 3 shows an exemplary floating point multiplication circuit capable of handling denormal results and/or operands.

FIG. 3 shows an exemplary five-stage pipeline 300 for performing multiply operations in a manner consistent with disclosed embodiments. Pipeline 300 is merely exemplary and, in general, may comprise fewer or additional stages based on design parameters. The dashed lines in FIG. 3A may delineate pipeline stages. Further, pipeline stages 310-330 may form part of multiplier 210.

In some embodiments, each of pipeline stages 310-350 may take one clock cycle. FIG. 3 shows exemplary operations, which may lie on a critical path, performed during each of stages. Each pipeline stage may also comprise other operations, which do not add to the cycle time of their respective pipeline stages. Some logical and/or functional units have been omitted for simplicity and ease of description.

In FIG. 3, in pipeline stage 310, a multiplicand may be input to Booth encoder 313, which may provide control signals to Booth multiplexer 315, which may generate partial products based on the control signals. The output of Booth multiplexer 315 is input to Carry Save Adders (CSA)/compressors 317. In some embodiments, compressors 317 may form part of a tree of Carry Save Adders (CSA) 317, which may take a plurality of partial product inputs for double precision FP operands and reduce or compress the plurality of partial product inputs to output fewer partial products 323, which may be input to CSA/compressors 325. During first stage 310 of pipeline 300, which, in some embodiments, may take one clock cycle, booth encoder 313 may take one-fourth of the cycle, booth multiplexer 315 may take another fourth, and CSA/compressors 317 may take half the cycle.

In some embodiments, second pipeline stage 320 may comprise CSA/compressors 325, which may receive partial products 323 output by previous pipeline stage 310. CSA 325 may include compressors and reduce the partial products to produce two partial product outputs shown as terms 333, which are input to Carry Lookahead Adder (CLA) 215. In some embodiments, pipeline stage 320 may take one clock cycle.

In some embodiments, CSA/Compressors 317, Partial Products 323, and CSA/Compressors 325 may form part of CSA 213. In some embodiments, pipeline stages 310 and 320 may be implemented, at least in part, by coupling the Booth encoders and multiplexers to a Wallace tree, Dada tree, or other CSA structure.

In pipeline stage 330, CLA 215 may add the two terms 333 and the result obtained by CLA 215 may be shifted by normalizing shifter 217. CLA 215 may perform a fast addition of the two partial product outputs 333 of CSA 325 and output an unrounded version of the multiplicative product (e.g. unrounded unshifted result R 216 (A*B)) to normalizing shifter 217. In some embodiments, pipeline stage 330 may take one clock cycle, with CLA 215 consuming three quarters of the cycle, while the portion of operations performed by normalizing shifter 217 in pipeline stage 330 may take one quarter of a cycle.

If both inputs to multiplier 210 are normal and the result is also normal, then no shifting takes place in normalizing shifter 217. However, if both inputs are normal but the result is denormal, then the normalizing shifter 217 needs to right shift the mantissa to insert leading zeroes so that the resulting exponent is equal to the minimum normal exponent. If there is a denormal input but the result of the multiply is normal, then normalizing shifter 217 needs to left shift the result to remove the leading zeroes that were in the denormal input. Also, if there is a denormal input and the result is also denormal, then normalizing shifter 217 needs to shift the resulting mantissa, left or right, so that the resulting exponent is equal to the minimum normal exponent. As used herein, in the context of the "normalizing shifter", the term "normalizing" is used to refer to: (i) the representation of standard floating point numbers in a normalized manner (e.g. as specified in the Institute of Electrical and Electronic Engineers (IEEE) 754 standard); and (ii) the representation of denormal numbers in a standard manner (e.g. as specified in the IEEE 754 standard).

In fourth pipeline stage 340, normalizing shifter 217 may be used to normalize the output of CLA 215. In some embodiments, pipeline stage 340 may take one clock cycle. Operations performed by normalizing shifter 217 may consume one third of a cycle in pipeline stage 340. The output of normalizing shifter 217 may be input to rounding module 248, which may round the result. Rounding module 248 along with exception testing, such as overflow, underflow, and inexact, may consume two thirds of a cycle in stage 340. If rounding module is shared between multiplier 210 and adder 240, then rounding module may also perform rounding for various other floating point arithmetic operations performed by circuit 200.

As discussed above, normalizing shifter 217 may normalize the mantissa of a normal number to remove leading zeroes. Accordingly, because the mantissa of a normal number always starts with a one, the first mantissa bit for a normal number is typically not stored and is termed the "implicit bit". Thus, in general, a normalized mantissa may be represented a binary number $m_p.m_{p-1}m_{p-2}m_{p-3} \ldots m_1m_0$, where $m_i$ represents a binary digit at position i, p is the precision, and $m_p$ is 1. When p=24, the number is a "single precision" floating point number, which comprises a sign bit, 8 exponent bits and 24 mantissa bits (23 of which are actually stored) for a total of 32 bits. When p=53, the number is a "double precision" floating point number, which comprises a sign bit, 11 exponent bits and 53 mantissa bits (52 of which are actually stored) for a total of 64 bits. Although the implicit bit is not stored, knowledge of the value of the implicit bit is available in the exponent bits.

Further, as discussed above, for sub-normal numbers, to permit graceful degradation of precision, leading zeroes may be used in the mantissa. In a subnormal number, the exponent is the minimum value for normal numbers but the first bit of the mantissa is a zero (i.e. the mantissa represents a binary number $0.m_{p-1}m_{p-2}m_{p-3} \ldots m_1m_0$). In the event that result 337 of CLA 213 is sub-normal, then, the output of normalizing shifter 217 may contain leading zeroes.

Further, the exponent is encoded using an offset-binary representation, which is also known as the exponent bias in the IEEE 754 standard, with the zero offset being 1023 for a double precision FP number and 127 for a single precision number. To obtain the actual exponent the exponent bias is subtracted from the exponent. In general, for normal numbers, a double-precision number may be described by:

$$(-1)^{sign} * 2^{(exponent-exponent\ bias)} * 1.mantissa.$$

while a denormal or subnormal double precision floating point number may be described by:

$$(-1)^{sign} * 2^{(1-exponent\ bias)} * 0.mantissa.$$

where, sign is the value of the sign bit.

After the shifting is accomplished, normal products will have at least one of the two most significant bits (msbs) on. That is because the product of two normal mantissas of k bits each will have either 2k or 2k−1 bits. For example, consider five and seven in binary, which are 101 and 111. For both of these values, k=3. Seven times seven is forty-nine, which is 111001 in binary and has 6 bits=2k. However, five times five is twenty-five, which is 011001 in binary and so has 5 bits, =2k−1. Because the shift amount for the normalizing shifter is determined by the exponents and number of leading zeroes in the input denormal values, a determination of whether the leading bit for a normal result is 1 or 0 is not known until after normalization. However, if the leading bit is zero, then the next bit must be a 1. In conventional injection rounding circuits, where injection is done before the carry look ahead addition, the injection occurs without knowledge of whether the msb of the addition result is a zero or a one. Thus, conventional injection rounding assumes one case, but if the assumption is incorrect, then a subsequent fixing adjustment is applied to the result of the addition thereby incurring an additional cost.

In the event that an increment of the mantissa is used to obtain the rounded result, the position of the bit to be added to accomplish the increment for a normal result might be in either one of two places, depending on whether the most significant bit is on or off. The position of the increment is p bits from the most significant bit, so if the most significant bit is off, the increment must be applied one position to the right of where it is applied if the most significant bit were on. The term "increment" as used herein with reference to a first number refers to the addition of the number "1" to the first number.

For a denormal result, the position of the bit to be added is the same as if the most significant bit were on since the position of the result is fixed by the denormal exponent and is not dependent on the position of the most significant bit of the product. For speed, in some embodiments, rounding module 248 may compute an incremented result (normal or denormal) as if the most significant bit were on without first checking to see if it is on.

A double precision multiply is considered as an example to illustrate the operation of rounding module 248 for cases where the shifted input (from shifter 217) may be: (i) normal and (ii) denormal. The shifted sum output by shifter 217 is designated S, accordingly, the most significant bit position of the shifted sum is S[127]. Since a double precision mantissa contains 53 bits, including the implicit bit, the position of the least significant bit (lsb) of the unrounded result is S[75] if position S[127]=1, otherwise it is S[74] for normal results.

Conceptually, if an increment is needed to obtain the rounded result and either S[127]=1 or the result is denormal, then rounding may be accomplished by adding 1 to S[75]. However if an increment is needed to obtain the rounded result and S[127]=0 and the result is normal, then, rounding is accomplished by adding 1 to S[74]. Thus, the actual rounded sum RoundedSum[ ] may be obtained by first determining an intermediate result Incremented[ ] as:

$$\text{Incremented}[53:0] = \begin{cases} S[127] \ldots S[75]S[74] \\ + \begin{cases} [0\ 1], \text{ if } S[127] = 0 \\ [1\ 0], \text{ if } S[127] = 1 \end{cases} \end{cases} \quad (1)$$

and then by setting: RoundedSum[52:0]=Incremented[52:0], if Incremented[53] is equal to 0 and the result is normal; or, setting RoundedSum [52:0]=Incremented[53:1] otherwise.

For double precision, in some embodiments, rounding module 248 may obtain a result R by incrementing S[127:75] without waiting to determine the value of S[127]. The result R may be represented as R[52:0] and the table in FIG. 4A shows how RoundedSum [52:0] may be obtained based on the values of S[127], S[74] and R[52].

The signal "increment needed" is determined based, in part, on the rounding mode used. When injection rounding is not used, the "increment needed" signal determines whether an increment to the unrounded result is used to obtain the rounded result. Accordingly, "increment needed" is 1, the unrounded result may be incremented, while if "increment needed" is 0, the unrounded result may not be incremented.

For normal results, the decision as to when an increment is needed is determined as follows: (i) For rounding to zero (RTZ), the unrounded result is not incremented; (ii) For rounding to (plus) infinity (RI), positive inexact results are incremented; (iii) For rounding to negative infinity (RNI), negative inexact results are incremented; and (iv) For rounding to nearest: (a) unrounded values that are more than half way between the two nearest representable values are incremented, as well as (b) unrounded values that are exactly half way between the two nearest representable values provided that the least significant bit of the smaller (in absolute value) representable value is on.

In Row 1, if S[127] is 1 or the result is denormal and no increment is needed, then RoundedSum [52:0]=S[127:75].

In Row 2, if S[127] is 0 and the result is normal, and no increment is needed, then RoundedSum [52:0]=S[126:74].

In Row 3, if S[127] is 1 or the result is denormal and an increment is needed, then RoundedSum [52:0]=R[52:0].

In Row 4, if S[127] is 0 and the result is normal, S[74]=0, and an increment is needed to S[74], then RoundedSum [52:0]={S[126:75], 1}. In general, the notation {G[i:j], H[k:l]} is used to represent the concatenation (or appending) of bits in the bitstring H from bit positions k through l with bits in the bitstring G from bit positions i through j. In some instances, for simplicity, G or H may be replaced with a bitstring showing the actual values of bits in the bitstring.

In Row 5, if S[127] is 0 and the result is normal, S[74]=1, R[52]=0, and an increment is needed to S[74], then RoundedSum [52:0]={R[51:0], 0}.

In Row 6, if S[127] is 0 and the result is normal, S[74]=1, R[52]=1, and an increment is needed to S[74], then RoundedSum [52:0] is given by R[52:0].

The values of (i) S[127], (ii) S[74], (iii) R[52], (iv) whether the result is normal or denormal, and (v) whether rounding is needed may determine the selection for a multiplexer within rounding module 248 to select its output from the six cases shown in FIG. 4A. The output of that multiplexer is the output 349 of rounding module 248. Because the value of RoundedSum [52:0] for Rows 3 and 6 are identical, Rows 3 and 6 may be combined in the multiplexer, thus the multiplexer may have only five inputs instead of six as is shown in FIG. 5A.

Figure 5A:
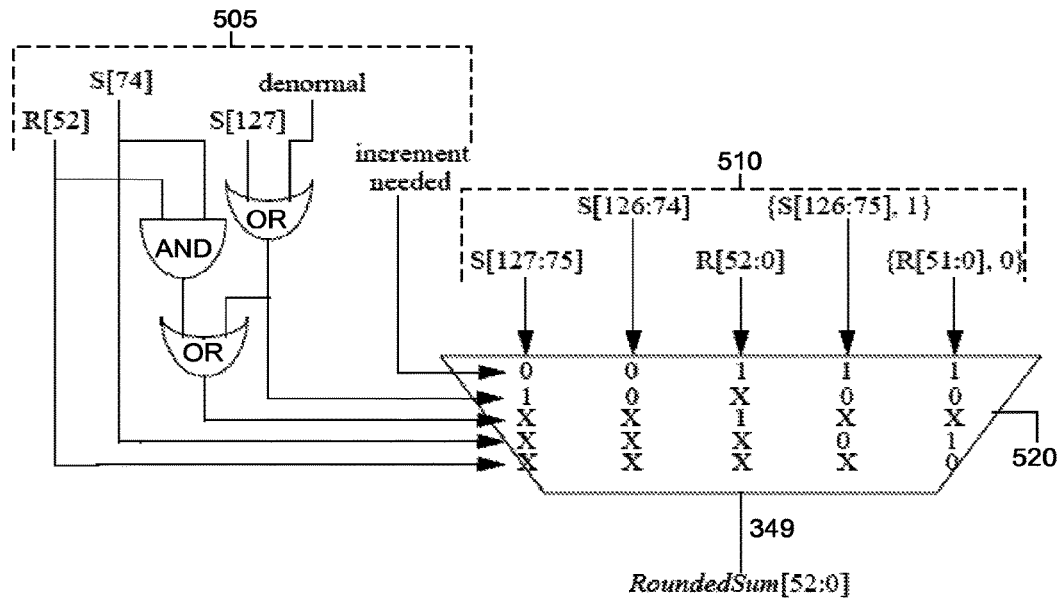
FIGS. 5A and 5B show block diagrams including exemplary multiplexers for implementing logic in Tables 400 and 475 in FIGS. 4A and 4C, respectively.

FIG. 5A shows an exemplary multiplexer 520, which may implement logic corresponding to Table 400 in FIG. 4A (with Rows 3 and 6 combined). Referring to FIG. 5A, the select signals 505 for exemplary multiplexer 520 are (i) increment needed, (ii) (S[127] OR denormal), (iii) [(R[52] AND S[74]) OR (S[127] OR denormal)], (iv) S[74], and (v) R[52].

These select signals 505 are used to select one of input signals 510 given by: (a) S[127:75], (b) S[126:74], (c) R[52:0], (d) {S[126:75], 1}, or (e) R[51:0], 0}, in accordance with the logic shown in Table 400 (in FIG. 4A). In FIG. 5A, the values of select signals (i) through (v) (shown within multiplexer 520) below each of the input signals (a) through (e) above indicate when that input signal is selected. The selected input signal may be output by multiplexer 520 as RoundedSum [52:0].

In FIG. 5A, the first column shown within multiplexer 520 corresponds to the first row of Table 400, since input S[127:75] is selected when: (i) no increment is needed, and (ii) either the result is denormal OR S[127] is on.

The second column shown within multiplexer 520 corresponds to the second row of Table 400, since input S[126:74] is selected when: (i) no increment is needed, and (ii) the result is normal AND S[127] is off (i.e. when (S[127] OR denormal)=0).

The fourth column shown within multiplexer 520 corresponds to the fourth row of Table 400, since input {S[126:75], 1} is selected when: (i) an increment is needed, (ii) the result is normal and S[127] is off, and, (iii) S[74] is off.

The fifth column shown within multiplexer 520 corresponds to the fifth row of Table 400, since {R[51:0], 0} is selected when: (i) an increment is needed, (ii) the result is normal AND S[127] is off, (iii) S[74] is on, and (iv) R[52] is off.

The third column shown within multiplexer 520 corresponds to the third and sixth rows of Table 400. The third column shown within multiplexer 520, selects R[52:0] when: (i) an increment is needed; and (ii) either (A) the result is denormal or S[127] is on (corresponding to the third row of Table 400), or (B) S[74] and R[52] are both on (corresponding to the sixth row of Table 400). As outlined above, when (S[127] OR denormal)=0, then condition (B) is met because the result is normal and S[127] is off.

Referring to FIG. 4B, in Table 450, rows 5 and 6 from FIG. 4A have been combined. Accordingly, Row 5 in Table 450 has been rewritten to indicate a don't care condition (X) for R[52] and result RoundedSum [52:0] has been written as {R[52] OR R[51], R[50:0], 0} instead of R[52:0] as shown in Table 450, in FIG. 4B. When R[52] is zero, then the last row of Table 450 is the same as Row 5 of Table 400. However, when R[52] is 1, then, R[50:0] is equal to R[51:1] since all these bits are off.

Further, for normal results, either R[52]=1 or R[51]=1, hence the expression R[52] OR R[51] is equal to 1, so that Row 5 in Table 450, FIG. 4B may be rewritten as {1, R[50:0], 0} as shown in FIG. 4C, in Row 5 of Table 475. Further, in Table 475, R[52] is "X" throughout and therefore can be eliminated from the select logic.

Figure 5B:
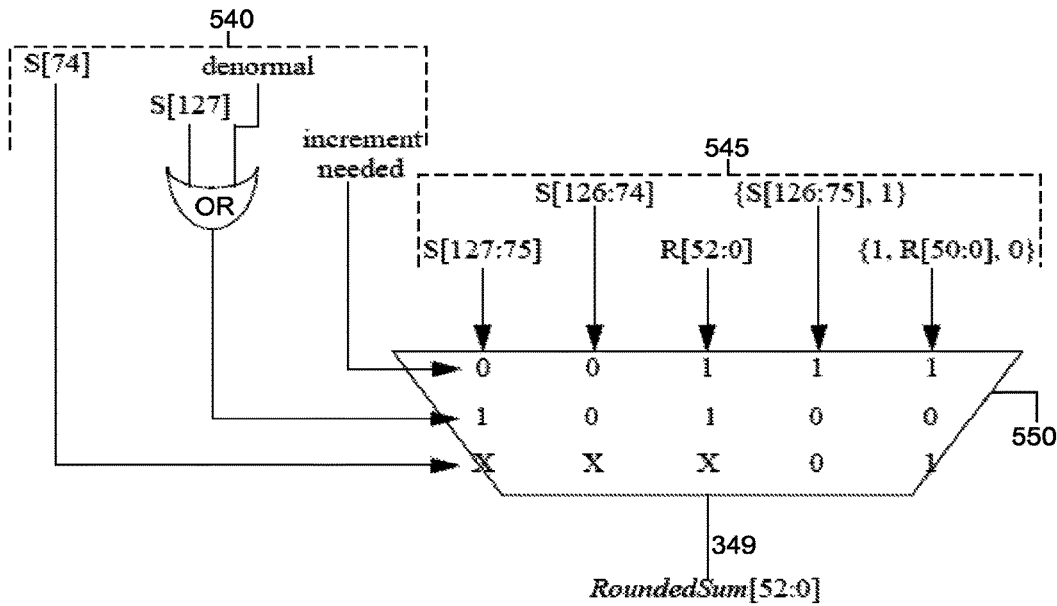

FIG. 5B illustrates exemplary multiplexer 550, which may implement logic corresponding to Table 475 in FIG. 4C. In some embodiments, multiplexer 550 may form part of rounding module 248. Referring to FIG. 5B, the select signals 540 for exemplary multiplexer 550 are (i) increment needed, (ii) (S[127] OR denormal), and (iii) S[74].

These select signals 540 are used to select one of input signals 545 given by: (a) S[127:75], (b) S[126:74], (c) R[52:0], (d) {S[126:75], 1}, or (e) {1, R[50:0], 0}, in accordance with the logic shown in Table 475 (in FIG. 4C). In FIG. 5A, the values of select signals (i) through (v) (shown within multiplexer 520) below each of the input signals (a) through (e) above indicate when that input signal is selected. The selected input signal may be output by multiplexer 520 as RoundedSum [52:0].

Note that in multiplexer 550 the select logic has been simplified. Accordingly, for multiplexer 550, the select values do not depend on the late arriving signal R[52]. Further, the select data inputs to multiplexer 550, do not have any additional logic (e.g. additional gates) associated with the select inputs.

In FIG. 5B, the first column shown within multiplexer 550 corresponds to the first row of Table 475, since input S[127:75] is selected when: (i) no increment is needed, and (ii) either the result is denormal OR S[127] is on.

The second column shown within multiplexer 550 corresponds to the second row of Table 475, since input S[126:74] is selected when: (i) no increment is needed, and (ii) the result is normal AND S[127] is off.

The third column shown within multiplexer 550 corresponds to the third row of Table 475. The third column shown within multiplexer 550, selects R[52:0] when: (i) an increment is needed; and (ii) the result is denormal or S[127] is on.

The fourth column shown within multiplexer 550 corresponds to the fourth row of Table 475, since input {S[126:75], 1} is selected when: (i) an increment is needed, (ii) the result is normal and S[127] is off, and, (iii) S[74] is off.

The fifth column shown within multiplexer 550 corresponds to the fifth row of Table 475, since {R[51:0], 0} is selected when: (i) an increment is needed, (ii) the result is normal AND S[127] is off, and (iii) S[74] is on.

For single precision numbers, if an increment is needed to obtain the rounded result and either S[127]=1 or the result is denormal, then rounding may be accomplished by adding 1 to S[104]. However, if an increment is needed to obtain the rounded result and S[127]=0 and the result is normal, then, rounding is accomplished by adding 1 to S[103]. Thus, the actual rounded sum may be represented by first:

$$\text{Incremented}[24:0] = \begin{cases} S[127] \ldots S[104]S[103] & (2) \\ + \begin{cases} [0\ 1], \text{ if } S[127] = 0 \\ [1\ 0], \text{ if } S[127] = 1 \end{cases} \end{cases}$$

and then RoundedSum[23:0]=Incremented[23:0] if Incremented[24] is equal to 0 and the result is normal, otherwise RoundedSum [23:0]=Incremented[24:1].

FIGS. 4D-4F illustrate an approach to obtain RoundedSum[23:0] for single precision floating point numbers in a manner similar to the double precision example outlined above. The result R may be represented as R[23:0]. RoundedSum[23:0] may be obtained based on the values of S[127], S[103], and R[23]. For single precision, in some embodiments, rounding module 248 may obtain result R by incrementing S[127:104] without waiting to determine the value of S[127]. The result R may be represented as R[23:0]. Table 480 in FIG. 4D shows how RoundedSum [23:0] may be obtained based on the values of S[127], S[103] and R[23]. Accordingly, in FIG. 4D:

In Row 1, if S[127] is 1 or the result is denormal and no increment is needed, then RoundedSum [23:0]=S[127:104].

In Row 2, if S[127] is 0 and the result is normal, and no increment is needed, then RoundedSum [23:0]=S[126:103].

In Row 3, if S[127] is 1 or the result is denormal and an increment is needed, then RoundedSum [23:0]=R[23:0].

In Row 4, if S[127] is 0 and the result is normal, S[103]=0, and an increment is needed to S[103], then RoundedSum [23:0]={S[126:104], 1}.

In Row 5, if S[127] is 0 and the result is normal, S[103]=1, R[23]=0, and an increment is needed to S[103], then RoundedSum [23:0]={R[22:0], 0}.

In Row 6, if S[127] is 0 and the result is normal, S[103]=1, R[23]=1, and an increment is needed to S[103], then RoundedSum [23:0] is given by R[23:0].

The values of (i) S[127], (ii) S[103], (iii) R[23], (iv) whether the result is normal or denormal, and (v) whether rounding is needed may determine the selection for a multiplexer within rounding module 248 to select its output from the six cases shown in FIG. 4D. The output of that multiplexer is the output 349 of rounding module 248. Because the value of RoundedSum [23:0] for Rows 3 and 6 are identical, Rows 3 and 6 may be combined in the multiplexer within rounding module 248, thus the multiplexer may have only five inputs instead of six.

In Table 485, in FIG. 4E, rows 5 and 6 from FIG. 4A have been combined, Accordingly, Row 5 in Table 4E has been rewritten to indicate a don't care condition (X) for R[23] and result RoundedSum [23:0] has been written as {R[23] OR R[22], R[21:0], 0}.

Further, for a normal result, either R[23]=1 or R[22]=1, hence the expression R[23] OR R[22] is equal to 1, so that Row 5 in Table 485, FIG. 4E may be rewritten as {1, R[21:0], 0} as shown in FIG. 4F, Table 490.

In conventional circuits, selects to the multiplexer within rounding module 248 for the output of rounding module 248 are not available until the increment is finished and hence R [ ] is available. Consequently, in conventional circuits, if the rounding increment occurs at the end of a fourth pipeline stage, then, depending on the time of availability of R [ ], the multiplexers may start at some point during the fifth pipeline stage. Thus, timing issues may arise because of the late availability of the select signals and may preclude completion of result selection and operand forwarding by the end of the fifth pipeline stage.

However, in circuits consistent with disclosed embodiments, for double precision, the multiplexer to obtain the output of rounding module 248 may be put in pipeline stage 340 because the selects (S[127], S[74], denormal result, and increment needed) for the multiplexer do not depend on the actual incremented result R as shown in FIG. 5B and thus can fan out while the increment is taking place. As shown in FIG. 4C, all entries in the column for R[52] are "X" indicating that the selects for the multiplexer do not depend on the actual incremented result R. Similarly, for single precision, as shown in FIG. 4F, all entries in the column for R[23] are "X" indicating that the selects (S[127], S[103], denormal result, and increment needed) for the multiplexer do not depend on the actual incremented result R. Thus, when the increment is done, the multiplexer is ready to go since the selects have already arrived. Further, as shown in Table 475, no additional processing of the incremented value, R, occurs for the data input before the multiplexer may proceed.

In circuits consistent with disclosed embodiments, the incremented result R may be used as input to the multiplexer within rounding module 248. Thus, the latency of obtaining the incremented result R (which does not depend on the most significant bit, S[127]), parallels the latency of the fixing adjustment in conventional injection rounding methods. Thus, injection rounding provides no speed advantage over circuits consistent with disclosed embodiments.

In circuits consistent with disclosed embodiments, CLA 215 may be placed before normalizing shifter 217. In contrast, in injection rounding the shifter is placed before the carry look ahead adder in order to determine where injection takes place. However, in injection rounding circuits, placing the shifter before the CLA without adding latency requires two shifters, one for each input of the CLA. In contrast, in circuits consistent with disclosed embodiments, a single shifter may be used for the result of the addition.

In some embodiments, pipeline stage 350 may include result selector 353, which may select one of output (from rounding module 248) or other value, such as special non computational cases like infinity, Not-a-Number, or a flushed result.

Further, based on select logic 355, operand forwarding selector may select one of the output of result selector 353 or a result from another unit.

In some embodiments, pipeline stage 350 may take one clock cycle. For example, result selector 353 may consume one quarter of a clock cycle, operand, operand selection for the multiply unit may consume one-quarter of a clock cycle, while operand forwarding to various functional units may take one half of the cycle.

As outlined above, in circuits 200 and 300, the carry look-ahead addition (using CLA 215) is performed before the shifting (using shifter 217) and the rounded result (using rounding module 248) is obtained after shifting. However, in contrast to circuits where the shifter is placed before carry lookahead adder, only one term needs to be shifted (in circuits 200 and 300) instead of two (in conventional injection rounding circuits). Further, in the embodiments shown in circuit 300, a multiply operation for a fused multiply add consumes 4 clock cycles, which is comparable to other designs (e.g. using injection rounding) where the shifting is performed before carry lookahead addition.

Moreover, for divide and square root instructions, when performed with a Newton-Raphson or similar quadratic convergence algorithm, in circuit 300, the multiply unit is used repeatedly to perform most of the computations. Because intermediate computations are scaled, no denormal values are encountered. Thus, the shifter 217 is not needed for divide and square root computations. Further, no rounding is done for the intermediate Newton-Raphson computations. Accordingly, in circuit 300, the result of the carry look-ahead addition late in the third clock may be fed back to the beginning of the multiply unit for the next pass thus taking only 3 clocks. In contrast, in many conventional designs, where the shifter is placed before the CLA, when no rounding is done it may consume 4 cycles. Therefore, circuit 300 also offers latency advantages over conventional circuits when performing divide and square root instructions.

As an illustrative example, where a double precision square root takes 8 passes or iterations (e.g. when using Newton Raphson) through the multiply unit, then the square root computation in conventional circuits would consume 8*4=32 clocks. In contrast, with circuit 300, only 8*3=24 clocks would be used.

Further, although the operation of rounding module 248 has been illustrated with respect to circuits 200 and 300, in general, rounding module may be used for rounding any floating point arithmetic operation. In addition, the techniques disclosed are not limited to single and/or double precision but may be used with floating point numbers of any specified precision.

In some implementations, the term "module" may indicate circuitry that implements a function or functions attributed to that module. The term "circuitry" does not imply a single electrically connected set of elements or circuits, or that circuitry for implementing a particular function must be specific or assigned solely to performing that function. For example, circuitry may be fixed function, configurable, or programmable. In general, circuitry implementing a functional unit may be configurable, or may be more configurable than specifically assigned circuitry. For example, an Arithmetic Logic Unit (ALU) of a processor may use the same portion of circuitry in a variety of ways when performing different arithmetic or logic operations. As such, that portion of circuitry is effectively circuitry, or part of circuitry, for each different operation, when configured to perform or otherwise interconnected to perform each of the different operations. Such configuration may come from or be based on instructions, microcode, or state data, for example. For the various modules disclosed herein, circuitry implementing process(es) or function(s) disclosed with respect to those modules provides a means for performing such process(es) or function(s).

Different approaches to design of circuitry exist, for example, circuitry may be synchronous or asynchronous with respect to a clock. Circuitry may be designed to be static or be dynamic. In general, different circuit design approaches may be used to implement different functional units or parts thereof. Absent some context-specific basis, "circuitry" encompasses all such design approaches. Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes or technologies may be used in circuitry implementing a given functional module, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with a then-current state of technology Further, although the description includes illustrative examples in connection with specific embodiments, the disclosure is not limited thereto. Various adaptations and modifications may be made without departing from the scope. Therefore, the spirit and scope of the appended claims should not be limited to the foregoing description.

The invention claimed is:

1. A rounding module for use in performing rounding in floating point arithmetic, the rounding module comprising:
   select logic configured to select one of
      a first bitstring selected from a first plurality of bitstrings, wherein each bitstring in the first plurality of bitstrings comprises a bit sequence of a received unrounded result of a floating point arithmetic operation, or
      a second bitstring selected from a second plurality of bitstrings, wherein each bitstring in the second plurality of bitstrings comprises a bit sequence of an incremented result obtained by incrementing the received unrounded result; and
   wherein the selection of the first or second bitstring is based on bits in the unrounded result and is not dependent upon the incremented unrounded result.

2. The rounding module of claim 1, wherein:
   the output of the rounding module represents a rounded floating point result.

3. The rounding module of claim 2, wherein:
   the rounded floating point result is a denormal floating point number.

4. The rounding module of claim 1, wherein:
   one of the first plurality of bitstrings is obtained by appending a 1 bit to the corresponding bit sequence of the unrounded result.

5. The rounding module of claim 1, wherein:
   one of the second plurality of bitstrings is obtained by appending a 0 bit to the corresponding bit sequence of the incremented unrounded result; and
   another of the second plurality of bitstrings is obtained by:
      appending the corresponding bit sequence of the incremented normalized unrounded result to a 1 bit to obtain a partial bitstring, and
      appending a 0 bit to the partial bitstring.

6. The rounding module of claim 1, wherein:
   the unrounded result is a denormal floating point number.

7. A floating point unit (FPU) configured to produce a rounded result of a floating point arithmetic operation, the FPU comprising:
   a rounding module configured to receive an unrounded result of an operation performed by the FPU, the rounding module further comprising:
      select logic configured to select one of:
         a first bitstring selected from a first plurality of bitstrings, wherein each bitstring in the first plurality of bitstrings comprises a bit sequence of the unrounded result, or
         a second bitstring selected from a second plurality of bitstrings, wherein each bitstring in the second plurality of bitstrings comprises a bit sequence of an incremented result obtained by incrementing the unrounded result; and
      wherein the selection of the first or second bitstring is based on bits in the unrounded result.

8. The floating point unit of claim 7, wherein:
   the selection of the first or second bitstring is based on at least one of:
   a denormal signal, an increment needed signal, and a value of a most significant bit position of a shifted sum.

9. The floating point unit of claim 8, wherein:
   the increment needed signal is based on a rounding mode used to perform the rounding.

10. The floating point unit of claim 7, wherein:
    the selection of the first or second bitstring is not dependent upon the incremented unrounded result.

11. The floating point unit of claim 7, wherein:
    the output of the rounding module represents a rounded floating point result.

12. The floating point unit of claim 11, wherein:
    the rounded floating point result is a denormal floating point number.

13. The floating point unit of claim 7, wherein the operation performed by the FPU comprises at least one of:
    addition, or
    subtraction, or
    multiplication, or
    division, or
    fused multiplication-addition, or
    square root determination, or
    reciprocal determination, or
    reciprocal square root determination, or
    a transcendental function determination.

14. The floating point unit of claim 7, wherein:
    one of the first plurality of bitstrings is obtained by appending a 1 bit to the corresponding bit sequence of the unrounded result.

15. The floating point unit of claim 7, wherein:
    one of the second plurality of bitstrings is obtained by appending a 0 bit to the corresponding bit sequence of the incremented unrounded result; and
    another of the second plurality of bitstrings is obtained by:
       appending the corresponding bit sequence of the incremented normalized unrounded result to a 1 bit to obtain a partial bitstring, and
       appending a 0 bit to the partial bitstring.

16. The floating point unit of claim 7, wherein:
    the unrounded result is a denormal floating point number.

17. A non-transitory computer-readable medium having stored thereon a computer readable dataset description of a floating point unit (FPU) configured to produce a rounded result of a floating point arithmetic operation, which dataset description when processed causes a processing system to generate a circuit layout description used in an integrated circuit manufacturing system to manufacture said FPU, wherein said FPU comprises:
a rounding module configured to receive an intermediate unrounded result of an operation performed by the FPU, the rounding module further comprising:
select logic configured to select one of:
a first bitstring selected from a first plurality of bitstrings, wherein each bitstring in the first plurality of bitstrings comprises a bit sequence of the unrounded result, or
a second bitstring selected from a second plurality of bitstrings, wherein each bitstring in the second plurality of bitstrings comprises a bit sequence of an incremented result obtained by incrementing the unrounded result,
wherein the selection of the first or second bitstring is based on bits in the unrounded result and is not dependent upon the incremented unrounded result.

18. The computer-readable medium of claim 17, wherein:
the output of the rounding module represents a rounded floating point result.

19. The computer-readable medium of claim 18, wherein:
the rounded floating point result is a denormal floating point number.

20. The computer-readable medium of claim 17, wherein:
the operation performed by the FPU comprises at least one of:
addition, or
subtraction, or
multiplication, or
division, or
fused multiplication-addition, or
square root determination, or
reciprocal determination, or
reciprocal square root determination, or
a transcendental function determination.

* * * * *